(12) United States Patent
Chen

(10) Patent No.: US 9,747,449 B2
(45) Date of Patent: Aug. 29, 2017

(54) METHOD AND DEVICE FOR PREVENTING APPLICATION IN AN OPERATING SYSTEM FROM BEING UNINSTALLED

(71) Applicant: Tencent Technology (Shenzhen) Company Limited, Shenzhen (CN)

(72) Inventor: Qiang Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 609 days.

(21) Appl. No.: 14/291,914

(22) Filed: May 30, 2014

(65) Prior Publication Data
US 2014/0283044 A1    Sep. 18, 2014

Related U.S. Application Data

(63) Continuation of application No. PCT/CN2014/070787, filed on Jan. 17, 2014.

(30) Foreign Application Priority Data

Jan. 31, 2013 (CN) .......................... 2013 1 0038943

(51) Int. Cl.
 G06F 21/00   (2013.01)
 G06F 21/57   (2013.01)
 G06F 9/445   (2006.01)

(52) U.S. Cl.
 CPC ............... *G06F 21/57* (2013.01); *G06F 8/62* (2013.01)

(58) Field of Classification Search
CPC combination set(s) only.
See application file for complete search history.

(56) References Cited

U.S. PATENT DOCUMENTS

2005/0182969 A1\* 8/2005 Ginter et al. ................ 713/201
2013/0067563 A1\* 3/2013 Park et al. .................... 726/17
(Continued)

FOREIGN PATENT DOCUMENTS

CN    101119362 A    2/2008
CN    102523593 A    6/2012
(Continued)

OTHER PUBLICATIONS

ISR and Written Opinion to PCT International Application No. PCT/CN2014/070787 dated May 6, 2014, (13p).

(Continued)

*Primary Examiner* — Jeffrey Pwu
*Assistant Examiner* — William Corum, Jr.
(74) *Attorney, Agent, or Firm* — Brinks Gilson & Lione

(57) ABSTRACT

Provided are a method and device for preventing the application in an operating system from being uninstalled. The method includes monitoring the operation executed for the application; determining whether the operation executed for the application is to uninstall the application; displaying at the client a prompt whether it is agreed to uninstall the application, if the operation executed for the application is to uninstall the application; the prompt whether it is agreed to uninstall the application may be displayed at the client after the operation executed for the application is determined to uninstall the application. Therefore, the method may prevent the malicious software from uninstalling maliciously, enhancing the security of the intelligent terminal.

6 Claims, 4 Drawing Sheets

(56) References Cited

U.S. PATENT DOCUMENTS

| | | | |
|---|---|---|---|
| 2013/0326499 A1* | 12/2013 | Mowatt et al. | 717/177 |
| 2013/0339937 A1* | 12/2013 | Meggison et al. | 717/168 |
| 2014/0013449 A1* | 1/2014 | Vijay et al. | 726/29 |
| 2014/0115607 A1* | 4/2014 | Pillers | 719/318 |

FOREIGN PATENT DOCUMENTS

| | | |
|---|---|---|
| CN | 102662667 A | 9/2012 |
| CN | 102810143 A | 12/2012 |
| CN | 102880817 A | 1/2013 |

OTHER PUBLICATIONS

First Office Action to Chinese Patent Application No. 201310038943.9, dated Feb. 15, 2015, (9p).

* cited by examiner

METHOD AND DEVICE FOR PREVENTING APPLICATION IN AN OPERATING SYSTEM FROM BEING UNINSTALLED

This application is a continuation application of International Application No. PCT/CN2014/070787, titled "METHOD AND DEVICE FOR PREVENTING APPLICATION IN AN OPERATING SYSTEM FROM BEING UNINSTALLED," filed on Jan. 17, 2014, which claims priority to Chinese patent application No. 201310038943.9, titled "Method and device for preventing application in an operating system from being uninstalled" and filed with the State Intellectual Property Office on Jan. 31, 2013, both of which are incorporated herein by reference in their entireties.

FIELD

The present disclosure relates to the field of mobile phone application security, and in particular to a method and device for preventing an application in an operating system from being uninstalled.

BACKGROUND

With the great increase in popularization of a smart mobile phone, the security issue of the smart mobile phone is becoming more and more apparent along with the convenience it brings to us. If the smart mobile phone is installed with eavesdropping software, it may result in the disclosure of communication content and sensitive data. Once a prevalent eavesdropping software is installed in the object mobile phone, the phone book and the call records may be downloaded, the message contents may be retrieved at any time, and the remote monitoring may also be realized by a specific phone book number, which is greatly harmful.

SUMMARY

Methods and devices are provided for preventing the application in the operating system from being uninstalled illegally and maliciously according to the embodiment of the disclosure.

In a first aspect, a method is provided for preventing an application in an operating system from being uninstalled according to an embodiment of the disclosure, which includes: monitoring an operation executed for the application; determining whether the operation executed for the application is to uninstall the application; and displaying a prompt about whether to agree to uninstall the application, if the operation executed for the application is to uninstall the application.

In a second aspect, a device for preventing the application in the operating system from being uninstalled according to the embodiment of the disclosure. The device includes a processor and a non-transitory storage medium accessible to the processor. The non-transitory storage medium configured to store modules comprising: a monitoring module, configured to monitor an operation executed for the application; a determining module, configured to determine whether the operation executed for the application is to uninstall the application; and a prompt module, configured to display a prompt about whether to agree to uninstall the application, if the operation executed for the application is to uninstall the application.

It can be seen from the embodiment of the disclosure above, a prompt about whether to agree to uninstall the application may be displayed at the client after it is determined that the operation executed for the application is to uninstall the application, therefore the method provided in the embodiment of the disclosure may prevent the malicious software from uninstalling maliciously, and thereby the security of the intelligent terminal is enhanced.

BRIEF DESCRIPTION OF THE DRAWINGS

In order to illustrate the solutions in the embodiment of the disclosure more clearly, the accompanying drawings will be described briefly, which are necessary for the description of the prior art or the present embodiment. Apparently, the accompanying drawings in the following description merely belong to part of the embodiment of the disclosure, and other drawings may be further acquired by those skilled in the art based on these accompanying drawings.

DETAILED DESCRIPTION OF THE DISCLOSURE

The solutions in the embodiment of the disclosure will be described clearly and completely below in conjunction with the accompanying drawings. Apparently, the described embodiments are only some but not all of the embodiments of the disclosure. Based on the embodiment of the disclosure, all the other embodiments acquired by those skilled in the art fall within the scope of protection of the disclosure.

Figure 1:
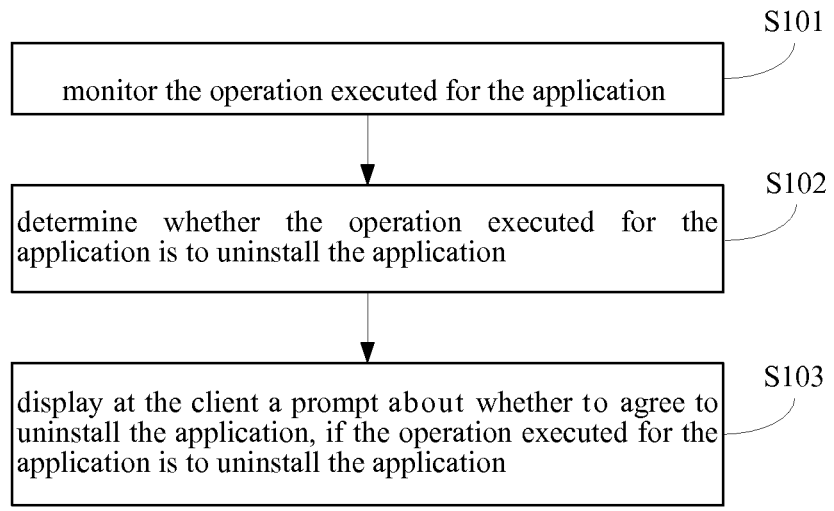
FIG. 1 is a schematic flow chart of a method for preventing an application in an operating system from being uninstalled according to an embodiment of the disclosure.

Reference is made to FIG. 1, which is a schematic flow chart of a method for preventing an application in an operating system from being uninstalled. The method is mainly implemented in an intelligent terminal, such as a smart mobile phone, a tablet computer, or any terminal device including a hardware processor and necessary circuits. The method exemplified in FIG. 1 for preventing the application from being uninstalled mainly includes the following steps S101, S102 and S103.

Step S101, monitoring an operation executed for the application.

In the embodiment of the disclosure, the operation executed for the application generally comes from malicious software, for example, eavesdropping software, and undercover software; and it may also come from an application of the same function developed by the software developers which are competitive with the present application developer. The most common operation executed for the application is to install the malicious software or the application of the same function after silent uninstallation of the application in the backstage. Apparently, the silent uninstallation is an illegal uninstallation behavior which may not be tolerant by the intelligent terminal.

For the operating system of the intelligent terminal, open source Android system, for example, may have a log system, in which the information generated from the operation executed for the application in the intelligent terminal is recorded, and each operation corresponds to a line of the log. The recorded information, i.e. the log contents, includes but is not limited to execution time, execution action, execution object and the like. Since each operation executed for the application in the intelligent terminal is recorded in the line of the log in real time, the operation currently executed for the application in the intelligent terminal can be obtained according to the log contents by monitoring the generated log contents in real time. In the embodiment of the disclosure, the monitoring the operation executed for the application may be realized by registering a monitor in the operating system for monitoring the log contents output from the log system.

Step S102, determining whether the operation executed for the application is to uninstall the application.

An application package name of an application is a name of the application, and is configured to uniquely identify the application in the intelligent terminal. The application package name is needed to be added into the script by which the operation is realized when a certain operation is executed for the application, for making clear of the execution object of the operation, so, in the embodiment of the disclosure, to determine whether the operation executed for the application is to uninstall the application, the application package name of the application, i.e. the name of the application may be acquired firstly.

The so-called operation executed for the application includes uninstalling the application, adding shortcut and so on. It should be noted that the operation executed for the application can be determined to uninstall the application only when the application uninstallation information and the application package name are both included in a line of the log contents. Therefore, it is necessary to determine whether the log contents output from the the log system includes the application package name which is the same as that of the execution object of the operation above, i.e., the application package name of the application, and the application uninstallation information, after the execution object of the operation above, i.e., the application package name of the application, is obtained; in which, for example, the application uninstallation information is Android.intent.action. DELETE for an Android system.

Since the sequence for application uninstallation information and the application package name to appear is not fixed in a line of the log, the determination rule may be set to determine at first whether the application uninstallation information is included in the line of the log, and then determine whether the application package name, which is the same as that of the execution object of the operation above, i.e., the application package name of the application, is included; or, the determination rule may be set to determine at first whether the application package name, which is the same as that of the execution object of the operation above, i.e., the application package name of the application, is included, and then determine whether the application uninstallation information is included in the line of the log; and the determination rule is not defined in the embodiment of the disclosure.

If the application package name, which is the same as that of the execution object of the operation above, i.e., the application package name of the application, is included in the log contents output from the log system, it may be confirmed that the operation executed for the application is to uninstall the application.

In another embodiment of the disclosure, an application installation information repository and an uninstallation protection repository may be queried. If the monitored operation executed for the application matches with the installation information queried in the application installation information repository and the uninstallation protection condition recorded in the uninstallation protection repository, it may be confirmed that the operation executed for the application is to uninstall the application. The installation information of the installed application is recorded in the application installation information repository, and the uninstallation protection condition of the installed application is recorded in the uninstallation protection repository.

Step S103, displaying at a client a prompt about whether to agree to uninstall the application, if the operation executed for the application is to uninstall the application.

In the embodiment of the disclosure, the prompt displayed at the client is about whether to agree to uninstall the application may be a pop-up dialog box on the screen, for inquiring the user whether to agree to uninstall the application.

It can be seen from the method for preventing the application in the operating system from being uninstalled according to the embodiment of the disclosure, a prompt about whether to agree to uninstall the application may be displayed at the client after it is determined that the operation executed for the application is to uninstall the application, so the method according to the embodiment of the disclosure may prevent the malicious software from maliciously uninstalling the application and installing itself in the intelligent terminal; and it may also prevent the competitors of the application developer from keeping the application silent in the backstage and installing illegally the application of the same function in the intelligent terminal developed by the competitors, and thereby the security of the intelligent terminal is enhanced.

Figure 2:
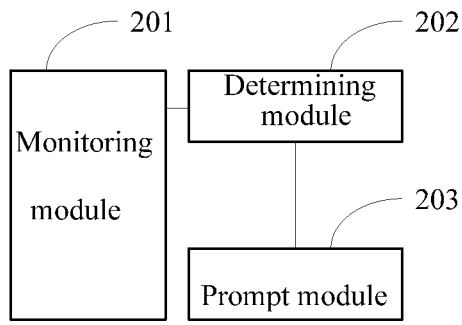
FIG. 2 is a schematic structural diagram of an device for preventing an application in an operating system from being uninstalled according to an embodiment of the disclosure.

Reference is made to FIG. 2, which is a schematic structural diagram of the device for preventing the application in the operating system from being uninstalled according to the embodiment of the disclosure. For illustration purpose, only the part related to the embodiment of the disclosure is shown. The device exemplified in FIG. 2 for preventing the application from being uninstalled may be a certain function module/unit in the intelligent terminal, which includes a monitoring module 201, a determining module 202, and a prompt module 203.

The monitoring module 201 is configured to monitor the operation executed for the application. In the present embodiment, the operation executed for the application may generally come from the malicious software, such as the eavesdropping software, and the undercover software; and it may also come from the application of the same function developed by the software developers which are competitive with the present application developer. The most common operation executed for the application is to execute silent uninstallation and install the malicious software or the application of the same function thereafter. Apparently, the silent uninstallation is an illegal uninstallation behavior, which may not be tolerant by the intelligent terminal.

The determining module 202 is configured to determine whether the operation executed for the application is to uninstall the application.

The prompt module 203 is configured to display at the client a prompt about whether to agree to uninstall the application, if the determination result of the determining module 202 is to uninstall the application.

It should be noted that in the embodiment of the device for preventing the application in the operating system from being uninstalled, the division of function modules is for illustration only, the above function may be assigned to different function modules to implement according to requirements, for example, the hardware configuration requirements or the convenience of the software implementation in practice. That is, the internal structure of the device for preventing the application in the operating system from being uninstalled is divided into different function modules to implement all or some of the functions described above. And, in practice, the corresponding function module in the embodiment may be either implemented by the corresponding hardware, or implemented by operating a corresponding software by the corresponding hardware. For example, the above monitoring module may be either the hardware executing the monitoring of the operation executed for the application, such as the monitor, or a general processor or other hardware device which may execute the corresponding computer program to implement the function above. The above determining module, as another example, may be either the hardware with the function of executing the determination of whether the operation executed for the application is to uninstall the application, such as the determination device, or a general processor or other hardware device which may execute the corresponding computer program to complete the above function. Each embodiment in the specification may be applicable to the principle described above.

Figure 3:
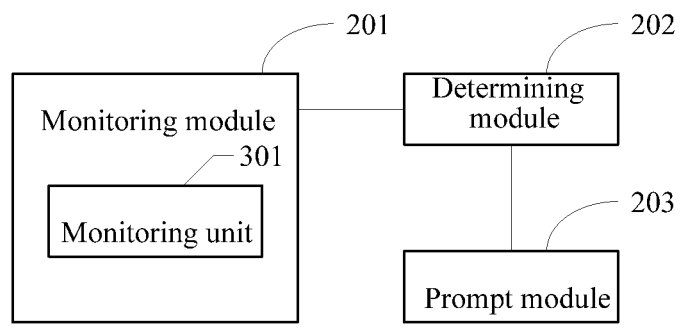
FIG. 3 is a schematic structural diagram of an device for preventing an application in an operating system from being uninstalled according to another embodiment of the disclosure.

The monitoring module 201 exemplified in FIG. 2 may include a monitoring unit 301, which is an device for preventing the application in the operating system from being uninstalled according to the embodiment of the disclosure as shown in FIG. 3. The operating system of the intelligent terminal, open source Android system, for example, may have a log system, in which the information generated from the operation executed for the application in the intelligent terminal is recorded, and each operation corresponds to a line of the log, the contents of which is the recorded information, including but not limited to execution time, execution action, execution object and the like. Since each operation executed for the application in the intelligent terminal is recorded in the line of the log in real time, the operation executed for the application in the intelligent terminal may be informed according to the log content through monitoring the generated log content in real time. In the device for preventing the application in the operating system from being uninstalled illustrated in FIG. 3, a monitor, i.e. monitoring unit 301, for monitoring the log content output from the log system may be registered in the operating system to realize the monitoring of the operation executed for the application.

Figure 4:
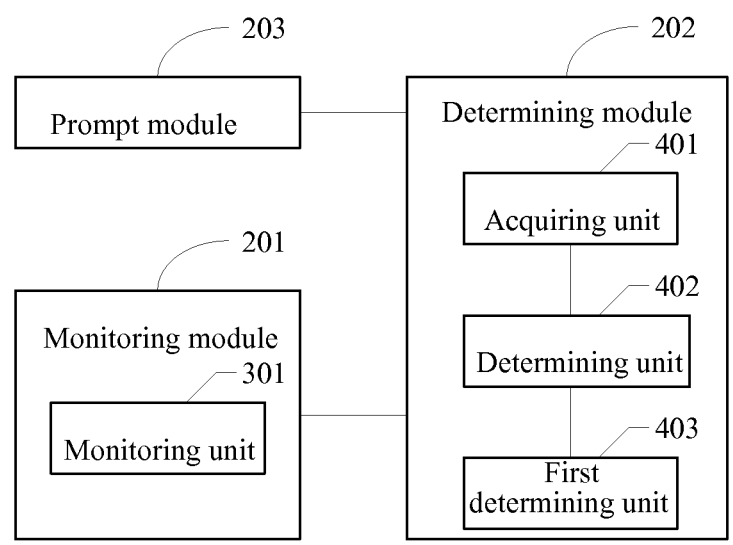
FIG. 4 is a schematic structural diagram of an device for preventing an application in an operating system from being uninstalled according to yet another embodiment of the disclosure.

The determining module 202 illustrated in FIG. 3 may include an acquiring unit 401, a determining unit 402, and a first determining unit 403, such as the device illustrated in FIG. 4 for preventing the application in the operating system from being uninstalled according to another embodiment of the disclosure.

The acquiring unit 401 is configured to acquire the application package name.

The determining unit 402 is configured to determine whether the log contents output from the log system includes the application package name and the application uninstallation information.

The application package name is the name of the application, configured to uniquely identify the application in the intelligent terminal. The application package name is needed to be added into the script by which the operation is realized when certain operation is executed for the application, for specifying the execution object of the operation. So, in the device for preventing the application in the operating system from being uninstalled as illustrated in FIG. 4, the application package name, i.e. the name of the application, may be acquired by the acquiring unit 401 at first when the determining module 202 determines whether the operation executed for the application is to uninstall the application.

The so-called operation executed for the application includes uninstalling the application, adding shortcut and so on. It should be noted that the operation executed for the application is determined to uninstall the application only when the application uninstallation information and a application package name of a certain application are included in the line of the log contents. Therefore, the determining unit 402 is required to determine whether the application package name and the application uninstallation information are included in the log contents output from the log system, in which the application package name is the same as that of the execution object of the operation above, i.e. application package name of the application, after the execution object of the operation above, i.e. the application package name, is acquired. In which, for example, the application uninstallation information is Android.intent.action.DELETE for Android system. Since the sequence for the application uninstallation information and the application package name to appear is not fixed in the line of the log, the determination rule may be set to firstly determine whether the application uninstallation information is included in the line of the log, then determine whether the application package name is included, which is the same as that of the execution object of the operation above, i.e. the application package name of the application; or, the determination rule may be set to firstly determine whether the application package name is included, which is the same as that of the execution object of the operation above, i.e. the application package name of the application, then determine whether the application uninstallation information is included in the line of the log; the determination rule is not defined in the embodiment of the disclosure.

The first determining unit 403 is configured to determine that the operation executed for the application is to uninstall the application if the log contents output from the log system includes the application package name, which is the same as that of the execution object of the above application, i.e. the application package name of the application, and the application uninstallation information.

The first determining unit 403 determines that the operation executed for the application is to uninstall the application, if the determining unit 402 determines that the log contents output from the log system includes the application package name, which is the same as that of the execution object of the above application, i.e. the application package name of the application, and the application uninstallation information.

Figure 5:
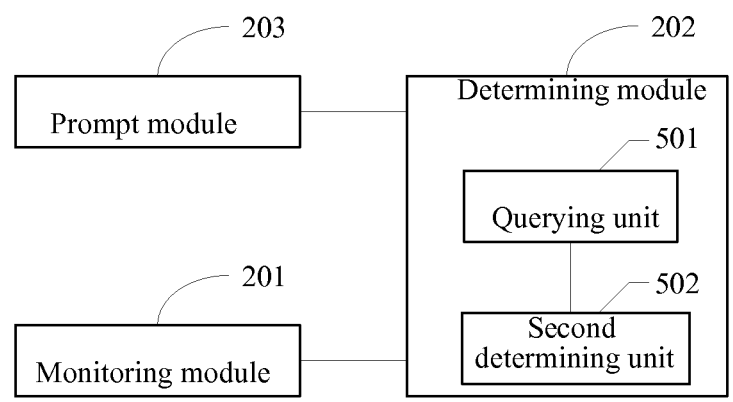
FIG. 5 is a schematic structural diagram of an device for preventing an application in an operating system from being uninstalled according to a further embodiment of the disclosure.

The determining module 202 illustrated in FIG. 2 may include a querying unit 501 and a second determining unit 503, such as the device for preventing the application in the operating system from being uninstalled according to another embodiment of the disclosure illustrated in FIG. 5.

The querying unit 501 is configured to query the application installation information repository in which the installation information of the installed application is recorded, and the uninstallation protection repository records the uninstallation protection condition of the installed application.

The second determining unit 502 is configured to determine that the operation executed for the application is to uninstall the application, if the query result of the querying unit 501 shows that the monitored operation executed for the application matches with the queried installation information and uninstallation protection condition.

Figure 6A:
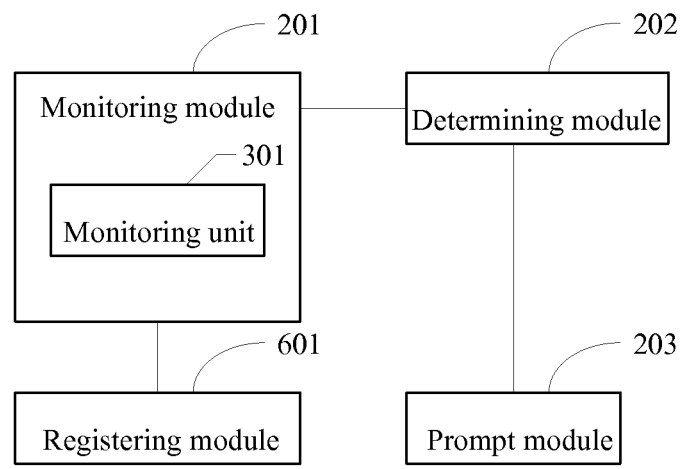
FIG. 6a is a schematic structural diagram of an device for preventing an application in an operating system from being uninstalled according to still another embodiment of the disclosure.
Figure 6B:
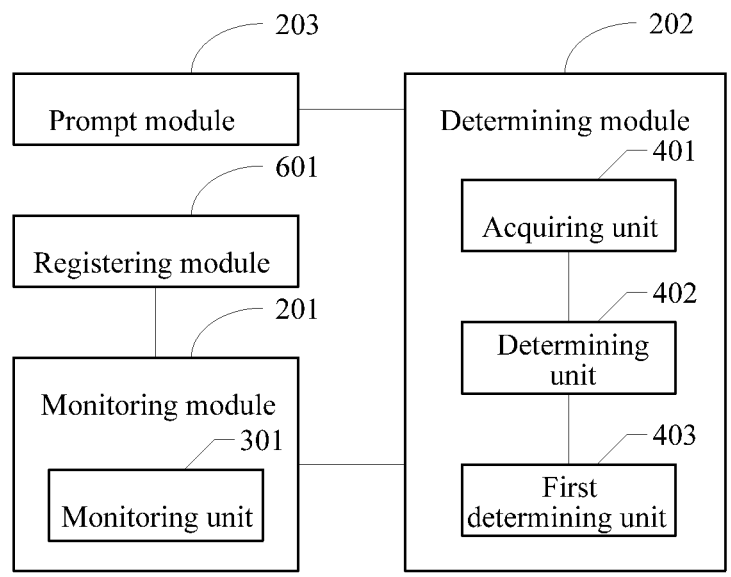
FIG. 6b is a schematic structural diagram of the device for preventing the application in the operating system from being uninstalled according to another embodiment of the disclosure.

The device for preventing the application in the operating system from being uninstalled illustrated in FIG. 3 and FIG. 4 may further include a registering module 601, such as the device for preventing the application in the operating system from being uninstalled according to another embodiment of the disclosure illustrated in FIG. 6a or FIG. 6b. The registering module 601 is configured to register a monitor in the operating system which monitors the log content output from the log system.

Figure 7:
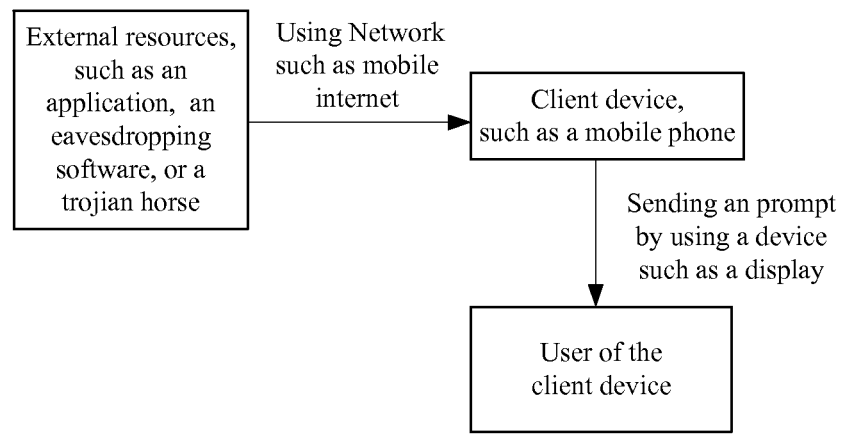
FIG. 7 is a hardware structure diagram according to an embodiment of the disclosure.

Reference is made to FIG. 7, which shows a hardware structure diagram according to an embodiment of the disclosure. In FIG. 7, external resources such as an application is shown to perform an operation to a client device of a user via a network such as a mobile internet, then the client may send an prompt by using a device such as a displayer to the user of the client device. The client device may be a computer or a mobile phone.

It should be noted that the technical effect brought by the information interaction and execution process among the modules/units in the device is the same as that of the method embodiment of the disclosure, since both are based on the same idea. Details may be seen from the description in the embodiment of the disclosure, and is not described in detail here.

It may be understood by those ordinary skilled in the art that all or some of the steps of the method in the above embodiments of the disclosure may be implemented by instructing the corresponding hardware with a program, such as one or more or all of the following method:

monitoring an operation executed for the application;
determining whether the operation executed for the application is to uninstall the application; and
displaying at the client a prompt about whether to agree to uninstall the application, if the it is determined that the operation executed for the application is to uninstall the application.

It may be understood by those ordinary skilled in the art that all or some of the steps of the all methods in the above embodiment of the disclosure may be implemented by instructing the corresponding hardware with a program, the program may be stored in a computer readable storage medium, which may include ROM, RAM, magnetic disk, CD and so on.

The method and device for preventing the application in the operating system from being uninstalled according to the embodiment of the disclosure have been described in detail above. The principle and implementation of the disclosure are illustrated by means of specific examples. The description of the embodiment above is only configured to help understanding the method and core idea of the disclosure. Further, for those ordinary skilled in the art, the specific implementation and application scope may vary somewhat according to the ideas of the disclosure. In summary, the specification should not be understood as to limit the disclosure.

The invention claimed is:

1. A method for preventing an application in an operating system from being uninstalled, comprising:
    registering a monitor in the operating system, wherein the monitor is configured to monitor the log contents from the log system;
    after registering the monitor in the operation system, monitoring, by a device having a processor, an operation executed for the application by monitoring log contents from a log system;
    determining, by the device, whether the operation executed for the application is to uninstall the application, wherein the determining comprises:
    acquiring, by the device, an application package name of the application;
    determining, by the device, whether a line of the log contents from the log system comprises the application package name and application uninstallation information of the application; and
    determining, by the device, that the operation executed for the application is to uninstall the application, if the device determines that the line of the log contents from the log system comprises both the application package name and the application uninstallation information; and
    displaying, by the device, a prompt about whether to agree to uninstall the application, if the device determines that the operation executed for the application is to uninstall the application.

2. The method according to claim 1, wherein determining whether an operation executed for the application is to uninstall the application comprises:
    querying, by the device, an application installation information repository in which installation information of an installed application is recorded, and an uninstallation protection repository in which an uninstallation protection condition of the installed application is recorded; and
    determining, by the device, that the operation executed for the application is to uninstall the application, if the monitored operation executed for the application matches with the queried installation information and uninstallation protection condition.

3. A device for preventing the application in an operating system from being uninstalled, comprising a processor and a non-transitory storage medium accessible to the processor, the non-transitory storage medium configured to store modules comprising:
    a monitoring module, configured to monitor an operation executed for the application by monitoring log contents from a log system;
    a determining module, configured to determine whether the operation executed for the application is to uninstall the application, wherein the determining module comprises:
    a registering unit, configured to register a monitor in the operating system, wherein the monitor is configured to monitor the log contents from the log system;

an acquiring unit, configured to, after the registering of the monitor, acquire an application package name of the application;

a determining unit, configured to determine whether a line of the log contents from the log system comprises the application package name and application uninstallation information of the application; and a first determining unit, configured to determine that the operation executed for the application is to uninstall the application, if it is determined by the determining module that the line of the log contents from the log system comprises both the application package name and the application uninstallation information; and a prompt module, configured to display a prompt about whether to agree to uninstall the application, if it is determined by the determining module that the operation executed for the application is to uninstall the application.

4. The device according to claim 3, wherein the determining module comprises:

a querying unit, configured to query an application installation information repository in which installation information of an installed application is recorded, and an uninstallation protection repository in which an uninstallation protection condition of the installed application is recorded; and a second determining unit, configured to determine that the operation executed for the application is to uninstall the application, if the query result of the query unit shows that the monitored operation executed for the application matches with the queried installation information and uninstallation protection condition.

5. A non-transitory computer-readable medium comprising codes which can be executed by a processor, when the codes are executed by the processor, the processor performs acts for preventing an application in an operating system from being uninstalled, the acts comprising:

registering a monitor in the operating system, wherein the monitor is configured to monitor the log contents from the log system;

after registering the monitor in the operating system, monitoring an operation executed for the application by monitoring log contents form a log system;

determining whether the operation executed for the application is to uninstall the application, wherein the determining comprises:

acquiring an application package name of the application;

determining whether a line of the log contents from the log system comprise the application package name and application uninstallation information of the application; and determining that the operation executed for the application is to uninstall the application, if it is determined that the line of the log contents from the log system comprises both the application package name and the application uninstallation information; and displaying a prompt about whether to agree to uninstall the application, if it is determined that the operation executed for the application is to uninstall the application.

6. The non-transitory computer-readable medium according to claim 5, wherein determining whether an operation executed for the application is to uninstall the application comprises:

querying an application installation information repository in which installation information of an installed application is recorded, and an uninstallation protection repository in which an uninstallation protection condition of the installed application is recorded; and determining that the operation executed for the application is to uninstall the application, if the monitored operation executed for the application matches with the queried installation information and uninstallation protection condition.

* * * * *